Dec. 11, 1945.  S. L. BURGWIN ET AL  2,390,774
WELDING CONTROL SYSTEM
Filed Nov. 24, 1943
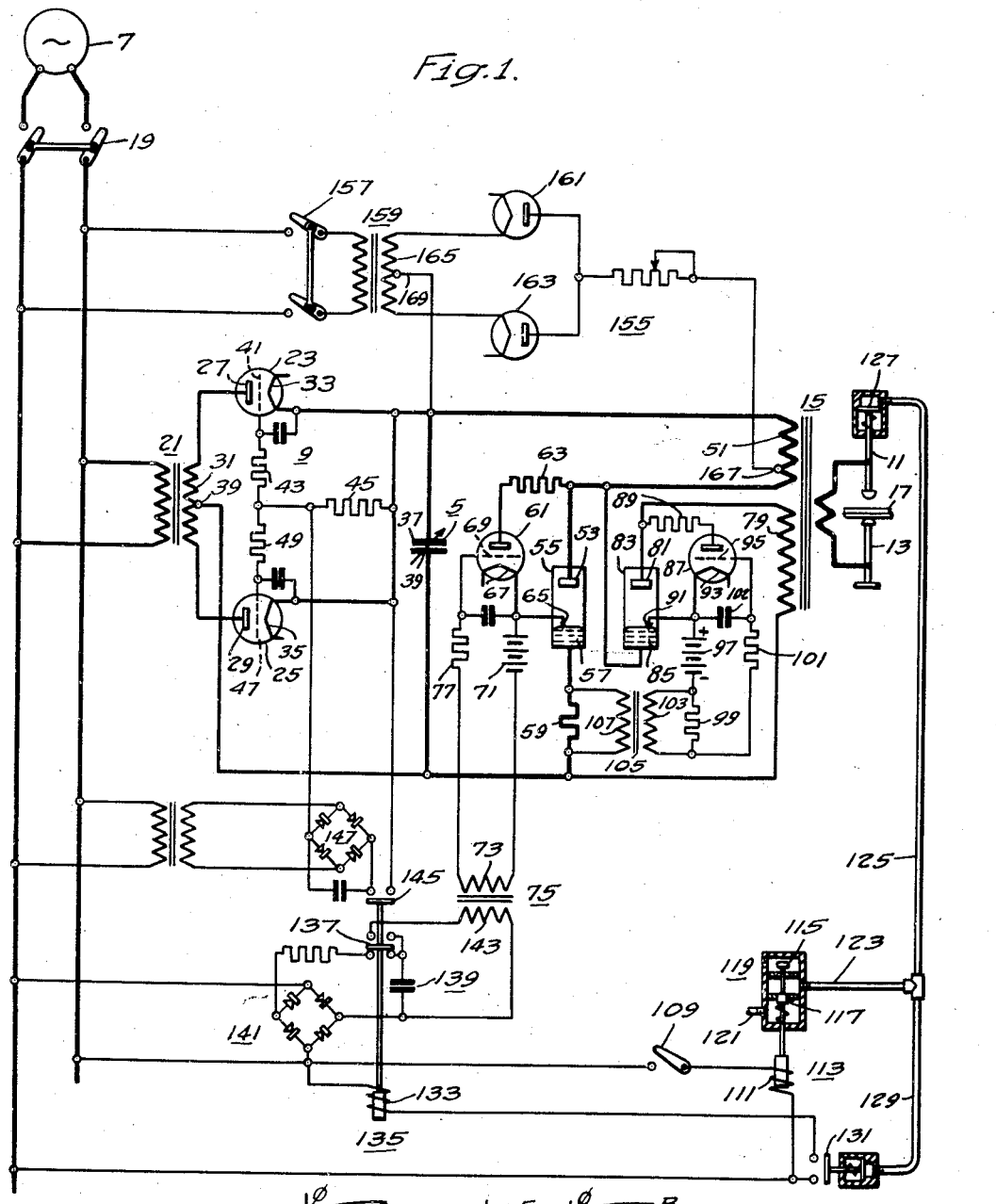
WITNESSES:
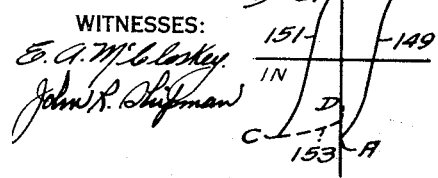
INVENTORS
Stephen L. Burgwin,
John R. Mahoney and
Harry J. Bichsel.
BY
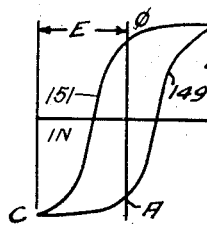
ATTORNEY Patented Dec. 11, 1945

2,390,774

UNITED STATES PATENT OFFICE 2,390,774

WELDING CONTROL SYSTEM

Stephen L. Burgwin, Forest Hills, John R. Mahoney, Homewood, and Harry J. Bichsel, Wilkinsburg, Pa., assignors to Westinghouse Electric Corporation, East Pittsburgh, Pa., a corporation of Pennsylvania Application November 24, 1943, Serial No. 511,576

19 Claims. (Cl. 219—4)

This invention relates to a welding control system and has particular relation to an electronic system for controlling the discharge of a power capacitor through the primary winding of a welding transformer.

In recent years a system for producing high quality welds has been developed which is known as capacitor discharge welding. A capacitor is precharged with a voltage of a magnitude which is preselected in accordance with the properties of the material to be welded. The charging circuit for the capacitor is blocked, and the capacitor is then discharged rapidly through the primary winding of a welding transformer, the secondary winding of the transformer being connected to supply energy to the welding electrodes. Discharge of the capacitor through the transformer causes sufficient current to flow through the welding electrodes and the material clamped therebetween to weld the material.

In apparatus constructed in accordance with the teachings of the prior art, an electric discharge valve of the arc-like type, such as an ignitron, is interposed between the capacitor and the primary winding of the welding transformer to control the instant of discharge of the capacitor. In addition, a second electric discharge valve of the arc-like type, such as an ignitron, is connected in shunt across the primary winding and arranged to conduct the current which flows upon the release, at the completion of the capacitor discharge, of the magnetic energy stored in the discharge circuit. Thus, the shunt valve is effective to prevent a substantial inverse charging of the capacitor. It is necessary to prevent the inverse charging of the capacitor in order to avoid large transients when the charging circuit is again unblocked, the charging circuit being effective to charge the capacitor with the same polarity each time. By preventing the inverse charging of the capacitor, the time required for recharging is also reduced.

The capacitor welding system as described is particularly advantageous in the welding of thin materials where an extremely accurate measurement of the energy used to produce the weld is necessary. However, the system also has certain defects. The welding apparatus is customarily arranged and operated to produce a series of welds in rapid succession. Thus, rapid charging and discharging of the capicitor is required with opening of the electrodes between successive welds to permit repositioning of the material to be welded. In the system described, current continues to flow through the shunt valve and the primary winding of the welding transformer for an appreciable length of time following the discharge of the capacitor. If the welding electrodes are opened during this time to permit movement of the material to another position for the next weld, an arc is produced at the electrode tips. Arcing at the electrodes necessitates frequent cleanings of the electrodes and reduces the life of the electrodes. Moreover, in the welding of aluminum, such arcing is practically intolerable as it removes the protective coating on the surface of the aluminum and initiates corrosion. Arcing at the electrodes is, therefore, highly undesirable and any attempt to increase the speed of operation by opening the electrodes earlier results in a more destructive arc.

In addition, energy is stored in the transformer core and the secondary winding circuit including the electrodes during the capacitor discharge. The energy so stored is not entirely dissipated in the shunt valve circuit, and, in most cases, sufficient energy remains after the shunt valve becomes non-conductive to produce an arc upon the opening of the electrodes.

It is also to be noted that the capacitor is discharged through the primary winding of the welding transformer in the same direction with each operation. Consequently, in ordinary operation, the transformer becomes highly saturated after a few successive welds and the efficiency of operation is greatly decreased unless means are provided for resetting the flux of the transformer. Methods of flux resetting now in commercial use employ a separate direct-current source of potential applied to all or part of the transformer primary winding to reset the flux. So much energy is required to reset the flux within a reasonable time with the welding electrodes closed, considering the rapid successive operations desired, that the direct-current potential is customarily applied to the primary winding to reset the flux while the welding electrodes are open between successive welds. This procedure still requires an expenditure of considerable power and involves the risk of serious arcing if the electrodes are accidentally shorted during the flux resetting period, as may occur when the position of the material to be welded is being shifted.

In some welders now in use, relay operated contactors are arranged to reverse the connections from the primary winding of the transformer to the capacitor between successive welds. Thus the capacitor is discharged through the primary winding in opposite directions for successive welding operations and saturation of the transformer is avoided. Use of the contactors is objectionable for several reasons, such as the short life of the contactors and the time delay imposed upon the apparatus to permit operation of the contactors. Moreover, although saturation is avoided by use of the contactors, as it is avoided by use of the direct-current flux resetting circuit described, electrode arcing is prevalent in both systems.

In a copending application filed on November 24, 1943, by Ezra T. Hughes and Stephen L Burgwin, assigned to the Westinghouse Electric & Manufacturing Company, and bearing Serial No. 511,575, there is disclosed a capacitor discharge welding circuit in which arcing at the welding electrodes is substantially avoided, and the flux of the transformer is reset rapidly and with but a comparatively low consumption of energy. A pair of inversely connected ignitrons is interposed between the capacitor and the primary winding of the welding transformer. When one of the ignitrons is rendered conductive, the capacitor discharges through the primary winding and is subsequently charged inversely. When current ceases to flow through the first ignitron, the second ignitron is rendered conductive to effect discharge of the inverse charge of the capacitor through the primary winding. In other words, because of the inductance and capacitance in the circuit, a damped oscillating current tends to flow, and the ignitrons are controlled to permit a single cycle of the oscillating current to pass through the primary winding. At the end of the single cycle of oscillating current, some energy is stored in the capacitor. However, this energy has the same polarity as the original charge, and, consequently, rapid recharging is facilitated.

In the system of the copending application, the first pulse of current through the primary winding during the cycle of oscillation is sufficient to produce a weld. The second pulse of current is insufficient to produce a weld because the inverse charge on the capacitor is lower in magnitude than the original charge. The second pulse of current is, however, sufficient to return the flux a substantial way toward its original state. As a result, the welding electrodes may be opened immediately upon the completion of the single cycle of oscillating current without substantial arcing. The time required for the single cycle of operating current is considerably less than the time required for discharge of the capacitor and the operation of the shunt valve in the prior art circuit previously described. Complete resetting of the flux is obtained in the system described in the copending application by supplying a relatively small direct current through a portion of the primary winding while the electrodes are open. While this current may be so small as to reduce greatly the chance of serious accidental arcing at the electrodes while they are open, there still is a chance for an arc to be produced.

It is an object of our invention to provide a new and improved capacitor discharge welding system in which complete flux resetting is accomplished quickly and efficiently.

Still another object of our invention is to provide a new and improved capacitor discharge welding system in which arcing at the electrode tips upon opening thereof is avoided.

Another object of our invention is to provide a new and improved capacitor discharge welding system, in which arcing at the electrode tips, upon opening thereof and upon accidental shorting thereof while open, is avoided.

A further object of our invention is to provide a novel capacitor discharge welding system in which saturation of the welding transformer and arcing at the tips of the welding electrodes upon opening thereof is avoided.

A still further object of our invention is to provide a novel capacitor discharge welding system in which complete flux resetting is quickly accomplished and arcing at the electrodes is avoided.

In accordance with our invention flux resetting and the removal of substantially all of the stored energy is accomplished before the electrodes are opened without employing an auxiliary source of power. With the usual welding transformer, we have found that the change in flux of the transformer by the discharge of the capacitor depends upon the total change in the charge on the capacitor. In making this finding we considered a circuit having a precharged capacitor connected by a valve across the primary winding of the transformer with the secondary winding being connected across the welding electrodes in engagement with the material to be welded. Then let $t$ = time.
$N_1$ = number of turns in the primary winding.
$N_2$ = number of turns in the secondary winding.
$\phi$ = flux of core of the transformer.
$\phi_0$ = initial flux of the core.
$L_2$ = Leakage inductance of the secondary winding plus the inductance of the secondary winding circuit.
$R_2$ = resistance of secondary winding circuit.
$Q$ = charge on the capacitor.
$Q_0$ = initial charge on the capacitor.
$i_1$ = current in primary winding.
$i_2$ = current in secondary winding.
$i_m$ = the magnetizing component of current.

The sum of the instantaneous voltages around the secondary winding circuit, $$N_2 \frac{d\phi}{dt} \times 10^{-8} = L_2 \frac{di_2}{dt} + R_2 i_2 \qquad (1)$$

Integrating both sides of Equation 1 with respect to $t$ gives $$N_2 \times 10^{-8} \int \frac{d\phi}{dt} dt = L_2 \int \frac{di_2}{dt} dt + R_2 \int i_2 dt \qquad (2)$$

or $$N_2 \times 10^{-8} \phi = L_2 i_2 + R_2 \int i_2 dt + \phi_0 \qquad (3)$$

now $$i_2 = \frac{N_1}{N_2}(i_1 - i_m) \qquad (4)$$

Substituting Equation 4 in Equation 3 gives $$\phi - \phi_0 = \frac{N_1}{N_2^2} \times 10^8 [L_2(i_1 - i_m) + R_2 \int i_1 dt - R_2 \int i_m dt] \qquad (5)$$

Since $i_m$ is small compared to $i_1$, Equation 5 is essentially $$\phi - \phi_0 = \frac{N_1}{N_2^2} \times 10^8 [L_2 i_1 + R_2 \int i_1 dt] \qquad (6)$$

however $$\int i_1 dt = Q - Q_0 \qquad (7)$$

which is the change in the charge on the capacitor.

Substituting Equation 7 in Equation 6 gives $$\phi - \phi_0 = \frac{N_1}{N_2^2} \times 10^8 [L_2 i_1 + R_2(Q - Q_0)] \qquad (8)$$

Then if at the instant following discharge of the capacitor when $t_1=0$, we let $\phi_1=$ the flux of the core and $Q_1$ the charge on the capacitor $$\phi_1 - \phi_0 = \frac{N_1}{N_2^2} \times 10^8 R_2(Q_1 - Q_0) \qquad (9)$$

In other words the change in flux of the transformer depends upon the change in the charge on the capacitor. It follows that to return the flux to its original state with the electrodes closed, requires a power-time product equal to the power-time product for the discharge of the capacitor.

In the circuit of the aforementioned copending application, a single cycle of oscillating current is permitted to flow through the primary winding for each welding operation. In accordance with our invention, a single cycle of oscillating current is also permitted to flow through the primary winding of the welding transformer. The present system differs from that disclosed in the aforementioned copending application in that the second pulse of current provided by the discharge of the inverse charge on the capacitor is passed through a greater number of turns of the primary winding than is the original discharge.

If $\phi_2$ is the flux of the core at the end of the second pulse of current when $i_2$ again equals zero, the change in flux effected by the second pulse is $(\phi_2 - \phi_1)$. The ratio of the change of flux by the first pulse to the change by the second pulse is then obtained from Equation 9 as follows where $R_3$ is the resistance of the secondary circuit for the second pulse and $N_3$ is the additional primary turns for the second pulse, $$\frac{(\phi_1 - \phi_0)}{(\phi_2 - \phi_1)} = \frac{\frac{N_1}{N_2^2} \times 10^8 R_2(Q_1 - Q_0)}{\frac{(N_1+N_3)}{N_2^2} \times 10^8 R_3(Q_2 - Q_1)} \qquad (10)$$

Since for all practical purposes $R_3 = R_2$ Equation 10 may be written as $$\frac{(\phi_1 - \phi_0)}{(\phi_2 - \phi_1)} = \frac{N_1(Q_1 - Q_0)}{(N_1+N_3)(Q_2 - Q_1)} \qquad (11)$$

To accomplish complete resetting of the flux $(\phi_1 - \phi_0)$ must equal $(\phi_2 - \phi_1)$ or $$N_1(Q_1 - Q_0) = (N_1+N_3)(Q_2 - Q_1) \qquad (12)$$

expressed another way $$\frac{N_1}{(N_1+N_3)} = \frac{(Q_1 - Q_0)}{(Q_2 - Q_1)} \qquad (13)$$

Thus the ratio of the number of turns through which the first pulse passes to the number of turns through which the second pulse passes must equal the ratio of the change of charge on the capacitor during the first pulse to the change in charge during the second pulse, to effect complete resetting of the flux. It is to be noted that with the usual transformer the percentage of change in charge on the capacitor is not the same for both the first and the second pulses of the oscillating current.

An even more satisfactory operation may be obtained, if desired, by providing a continuous direct-current potential across a portion of the primary winding. The purpose of this direct-current potential is not to reset the flux as in existing commercial machines, but to act merely as a flux bias to prevent a drifting of the flux after the welding operation is completed.

The novel features of our invention are pointed out with more particularity in the appended claims. The invention itself, however, both as to its organization and operation, together with additional objects and advantages thereof, will best be understood from the following description of a specific embodiment with reference to the drawing, in which:

Figure 1 is a schematic diagram of one embodiment of the invention; and

Figs. 2 and 3 are curves illustrating the magnetization of the welding transformer.

As shown in Fig. 1, a variable capacitor 5 is arranged to be charged from an alternating-current source 7 through a charging circuit 9 and to supply energy to a pair of welding electrodes 11 and 13 through a welding transformer 15. One of the welding electrodes 13 is fixed, while the other electrode 11 is movable relative thereto by a hydraulic system to clamp the material 17 to be welded therebetween.

Energy is supplied to the charging circuit 9 from the source 7 through a circuit breaker 19 and an auxiliary transformer 21. The charging circuit 9 includes a pair of rectifier valves 23 and 25, preferably thyratrons, having their anodes 27 and 29 connected to opposite terminals of the secondary 31 of the auxiliary transformer 21. The cathodes 33 and 35 of the rectifier valves 23 and 25 are connected together and to one plate 37 of the capacitor 5. The other plate 39 of the capacitor 5 is connected to a center tap 39 on the secondary 31 of the auxiliary transformer 21.

The grid 41 of the first rectifier valve 23 is connected to the cathode 33 through a grid resistor 43 and another resistor 45. The grid 47 of the second rectifier valve 25 is connected to its cathode 35 through a corresponding grid resistor 49 and the resistor 45 which is also in circuit between the grid 41 and cathode 33 of the first rectifier valve 23. Consequently, the grids 41 and 47 of the rectifier valves 23 and 25 are originally at the same potential as the cathodes 33 and 35 so that current is conducted through the valves to charge the capacitor 5 with the first plate 37 positive and the second plate 39 negative. The positive plate 37 of the capacitor 5 is connected to one end of a first section 51 of the primary winding of the welding transformer 15. The other end of the first section 51 of the primary winding is connected to the anode 53 of an ignitron 55, the cathode 57 of which is connected through a resistor 59 to the other plate 39 of the capacitor 5. Consequently, when the ignitron 55 is rendered conductive, the capacitor 5 is discharged through the first section 51 of the primary winding and the ignitron 55.

An electric discharge valve 61 of the arc-like type, known as the firing valve, preferably a thyratron, is connected in series with a resistor 63 between the anode 53 and the ignition electrode 65 of the ignitron 55. When the firing valve 61 becomes conductive, current flows from the capacitor 5 through the valve 61 and the ignition electrode 65 of the ignitron 55 to render the ignitron 55 conductive and thereby effect rapid discharge of the capacitor 5 therethrough. The cathode 67 of the firing valve 61 is connected to the grid 69 through a source of biasing potential such as a battery 71, the secondary 73 of a peaking transformer 75, and a grid resistor 77. The biasing potential normally maintains the firing valve 61 non-conductive, but when an impulse is supplied through the peaking transformer 75 in a manner described hereinafter, the firing valve 61 is instantly rendered conductive to fire the ignitron 55.

The primary winding of the welding transformer 15 is divided into two sections 51 and 79, and one terminal of the second section 79 is connected to the plate 39 of the capacitor 5 which is originally negative. The other terminal of the second section 79 of the primary winding is connected to the anode 81 of a second ignitron 83, the cathode 85 of which is connected to the terminal of the first section 51 adjacent the anode 53 of the first ignitron 55. To render the second ignitron 83 conductive, another electric discharge valve 87 of the arc-like type, preferably a thyratron and known as the second firing valve, is connected in series with a current limiting resistor 89 between the anode 81 and the ignition electrode 91 of the second ignitron 83. The cathode 93 of the second firing valve 87 is connected to the grid 95 through a source of biasing potential such as a battery 97, a resistor 99, and a grid resistor 101. A capacitor 102 is also connected directly between the grid 95 and cathode 93. The resistor 99 is also connected across the secondary 103 of a specially designed transformer 105, the primary 107 of which is connected across the resistor 59 in series with the first ignitron 55.

When the capacitor 5 is originally discharged through the first section 51 of the primary winding and the first ignitron 55, the current through the resistor 59 causes a potential to appear across the resistor. The special transformer 105 is an impulse transformer designed to be saturated by a very low current through the resistor 59. The transformer then produces an impulse across its secondary 103 at the beginning and at the end of the current pulse through resistor 59. Because of the inductance of the primary 107, the voltage impulse across the secondary 103 of the special transformer at the end of the current pulse tends to exist beyond the instant of zeo current through the first ignitron. This potential impulse is of such polarity and magnitude as to overcome the biasing potential and render the firing valve 87 conductive. The capacitor 102 attains a charge from the secondary winding impulse which insures the rendering of firing valve 87 conductive after the first ignitron becomes non-conductive. At this time, an inverse charge is present on the capacitor 5, and when the firing valve 87 is rendered conductive, the second ignitron 83 becomes conductive to effect rapid discharge of the inverse charge on the capacitor 5 through both the first and second sections 51 and 79 of the primary winding.

To initiate a welding operation, the circuit breaker 19 is first closed. The capacitor 5 is then charged from the source 7 through the charging circuit 9. Thereafter a switch 109 is closed connecting the coil 111 of a solenoid 113 in circuit with the source. Energization of the solenoid 113 closes a pressure release valve 115 and opens a pressure inlet valve 117 in a controller 119 in the hydraulic system. Hydraulic pressure is then applied from a source which is not shown through an inlet pipe 121, the inlet valve 117, and pipes 123 and 125 to depress a piston 127. The piston 127 is mounted on the movable electrode 11 so that depression of the piston 127 causes the electrode 11 to move downwardly, clamping the material 17 to be welded between the electrodes 11 and 13. After the material 17 is so clamped, the pressure acts through pipe 129 to close a pressure switch 131 connecting the coil 133 of a relay 135 in circuit with the source 7. A first contactor 137 of the relay 135 is originally positioned to complete a circuit for charging an auxiliary capacitor 139 from an auxiliary source 141 of direct-current potential. When the relay 135 is energized, the first contactor 137 opens the charging circuit of the auxiliary capacitor 139 and closes a circuit connecting the capacitor 139 across the primary 143 of the peaking transformer 75. The capacitor 139 then discharges through the primary 143 of the peaking transformer 75, causing the first ignitron 55 to be rendered conductive.

A second contactor 145 on the relay 135 closes upon energization of the relay and connects an auxiliary source 147 of direct-current biasing potential across the resistor 45 in the grid-cathode circuits of the rectifier valves 23 and 25. This biasing potential is sufficient to maintain the valves 23 and 25 non-conductive and prevent further charging of the main capacitor 5.

When the first ignitron 55 becomes conductive, the capacitor 5 discharges through the first section 51 of the primary winding of the welding transformer 15 and is subsequently charged with an inverse polarity. As current ceases to flow through the first ignitron 55, the second ignitron 83 is rendered conductive so that the inverse charge on the capacitor 5 is discharged through both the first and second sections 51 and 79 of the primary winding. It is to be noted that because of the attenuation of the discharge circuit, the inverse charge on the capacitor 5 is less than the original charge. Consequently, although the first discharge of the capacitor through the first section 51 of the primary winding is sufficient to produce a weld, the second discharge through both the first and second sections 51 and 79 of the primary winding is insufficient to produce a weld. However, because of the additional number of turns through which the second discharge passes, the magnetization of the transformer may be returned to its original state.

I have found that with a circuit attenuation such that the maximum inverse charge on the capacitor is of the order of one-half of the original charge, complete resetting of the flux may be accomplished by having the number of turns in the second section 79 equal to approximately twice the number of turns in the first section 51. In other words, the discharge of the inverse charge on the capacitor 5 passes through three times as many turns as the original discharge. If the inverse charge is less than one-half of the original charge, the magnetization does not quite return to its original state. If the inverse charge is greater than one-half the original charge, the magnetization overshoots the original value. The latter condition is to be desired due to the hysteresis of the core. Other ratios of the number of turns in the two sections of the primary winding may, of course, be used, but the ratio given is believed to be the most practical. With an inverse charge of a different percentage of the original charge, other turn ratios must be employed. In any case, the turn ratios with respect to the inverse charge should be such that the flux is substantially reset.

Although we have shown a transformer having a primary winding in two sections, a single primary winding with an intermediate tap may be used. It is to be noted that the primary winding in two sections is preferred as the second section may be formed with smaller wire.

The magnetization of the transformer 15 is illustrated in Fig. 2 by a magnetization curve of the familiar type with flux, $\phi$, plotted vertically and ampere turns, IN, plotted horizontally. Assuming the magnetization to be at point A on the curve when the first ignitron is rendered conductive, the magnetization follows along the curve up to point B and back down part way along curve 151, and when the second ignitron 83 conducts, the magnetization continues along curve 151 to point C where the magnetization has its original value. However, while the capacitor is being recharged between successive welds, the flux may drift along the dotted line 153 to a point D less than the initial value.

The effect of drifting of the flux may be eliminated, by adjusting the relationship of the two sections of the primary winding so that the flux is returned to a point beyond point C and may then drift back to point A. It is probably even more satisfactory to prevent drifting by providing a flux biasing circuit 155. The flux biasing circuit is energized from the source 7 through a switch 157 and an auxiliary transformer 159. A pair of rectifier valves 161 and 163 are connected between opposite end terminals of the secondary 165 of the auxiliary transformer 159 and an intermediate point 167 on the first section 51 of the primary winding. An end terminal of the first section 51 is then connected to a center tap 169 on the secondary 165 of the auxiliary transformer 159. In this manner, a direct-current potential is impressed across a portion of the primary winding. This potential may be comparatively small and acts merely as a flux bias.

The operation of the system using the flux biasing circuit is shown by a magnetization curve in Fig. 3. Because of the bias, the magnetization of the transformer is at the point C at the time the first ignitron 55 is rendered conductive. During the original discharge of the capacitor 5, the magnetization rises along the curve 149 and returns partially along the curve 151. Then during the discharge of the inverse charge on the capacitor 5, the magnetization continues downwardly along the curve 151 to the point C. Since the flux bias of a value represented by E is constantly present, the flux will not drift in the manner illustrated in Fig. 2, but remains at its original value at point C.

Although we have shown and described a specific embodiment of my invention, we are aware that many modifications thereof are possible. Our invention, therefore, is to be restricted only by the spirit thereof and the scope of the prior art.

We claim as our invention:

1. For use in supplying current to a load through a magnetic core transformer having primary and secondary windings with said secondary being connected in circuit with said load, the combination comprising a capacitor, means for precharging said capacitor, means for effecting discharge of the precharged capacitor in one direction through a first predetermined number of turns of said primary winding whereby said capacitor is subsequently charged inversely, and means for thereafter effecting discharge of the inversely charged capacitor in the opposite direction through a second predetermined number of turns of said primary winding greater than said first number.

2. For use in supplying current to a load through a magnetic core transformer having primary and secondary windings with said secondary being connected in circuit with said load, the combination comprising a capacitor, means for precharging said capacitor, means for effecting discharge of the precharged capacitor in one direction through a first predetermined number of turns of said primary winding whereby said capacitor is subsequently charged inversely, and means operable upon the completion of the inverse charging of said capacitor for effecting discharge of the inversely charged capacitor in the opposite direction through a second predetermined number of turns of said primary winding greater than said first number.

3. For use in supplying current to a load through a magnetic core transformer having primary and secondary windings with said secondary being connected in circuit with said load, the combination comprising a capacitor, means for precharging said capacitor, means for effecting discharge of the precharged capacitor in one direction through a first predetermined number of turns of said primary winding whereby said capacitor is subsequently charged inversely, and means responsive to current through said first number of turns and operable when said current becomes substantially zero following said discharge for effecting discharge of the inversely charged capacitor in the opposite direction through a second predetermined number of turns of said primary winding greater than said first number.

4. For use in supplying current to a load through a magnetic core transformer having primary and secondary windings with said secondary being connected in circuit with said load, the combination comprising a capacitor, means for precharging said capacitor, means including first electric valve means for effecting discharge of the precharged capacitor in one direction through a first predetermined number of turns of said primary winding whereby said capacitor is subsequently charged inversely, and means including second electric valve means operable in response to a cessation of current through said first number of turns following said discharge for effecting discharge of the inversely charged capacitor in the opposite direction through a second predetermined number of turns of said primary winding greater than said first number.

5. For use in supplying current to a load through a magnetic core transformer having primary and secondary windings with said secondary being connected in circuit with said load, the combination comprising a capacitor, means for precharging said capacitor, means including a first electric discharge valve of the arc-like type connecting said capacitor in circuit with a first predetermined number of turns of said primary winding, means including a second electric discharge valve of the arc-like type connecting said capacitor in circuit with a second predetermined number of turns of said primary winding greater than said first number, means for rendering said first valve conductive, said first valve being capable of conducting current in a direction to effect discharge of said precharged capacitor whereby said capacitor is subsequently charged inversely, and means operable when said first valve becomes non-conductive following said inverse charging for rendering said second valve conductive, said second valve being capable of conducting current in a direction to effect discharge of the inversely charged capacitor.

6. A system for supplying current to a load comprising a magnetic core transformer having a primary winding with a plurality of sections and a secondary winding, means connecting said secondary winding in a circuit with said load, a capacitor, means for precharging said capacitor, means connecting one side of said capacitor to one end of the first of said primary sections, a first electric discharge valve of the arc-like type connected in circuit between the other side of said capacitor and the other end of said first primary section, a second electric discharge valve of the arc-like type connected in a series circuit with the second primary section between said other side of said capacitor and said other end of said first primary section, means for rendering said first valve conductive, said first valve being capable of conducting current in a direction to effect discharge of the precharged capacitor through said first primary section, whereby said capacitor is subsequently charged inversely, and means operable when said first valve becomes non-conductive for rendering said second valve conductive, said second valve being capable of conducting current in a direction to effect discharge of the inversely charged capacitor through both said first and said second primary sections.

7. For use in supplying current to a load through a magnetic core transformer having primary and secondary windings with said secondary being connected in circuit with said load, the combination comprising a capacitor, means for precharging said capacitor, means for supplying a direct current through at least a portion of said primary winding as a flux bias for said transformer, means for effecting discharge of the precharged capacitor in one direction through a first predetermined number of turns of said primary winding whereby said capacitor is subsequently charged inversely, the transformer flux being changed by said discharge, and means for thereafter effecting discharge of the inversely charged capacitor in the opposite direction through a second predetermined number of turns of said primary winding greater than said first number to reset the transformer flux.

8. For use in supplying current to a load through a magnetic core transformer having primary and secondary windings with said secondary being connected in circuit with said load, the combination comprising a capacitor, means for precharging said capacitor, an auxiliary source of direct current potential connected in circuit with at least a portion of said primary winding to supply direct current therethrough as a flux bias for said transformer, means for effecting discharge of the precharged capacitor in one direction through a first predetermined number of turns of said primary winding whereby said capacitor is subsequently charged inversely, the transformer flux being changed by said discharge, and means operable when the current through said first number of turns becomes substantially zero following said discharge for effecting discharge of the inversely charged capacitor in the opposite direction through a second predetermined number of turns of said primary winding greater than said first number to reset the transformer flux.

9. For use in supplying current to a load through a magnetic core transformer having primary and secondary windings with said secondary being connected in circuit with said load, the combination comprising a capacitor, means for precharging said capacitor, means for supplying a direct current through at least a portion of said primary winding as a flux bias for said transformer, means including a first electric discharge valve of the arc-like type connecting said capacitor in circuit with a first predetermined number of turns of said primary winding, means including a second electric discharge valve of the arc-like type connecting said capacitor in circuit with a second predetermined number of turns of said primary winding greater than said first number, means for rendering said first valve conductive, said first valve being capable of conducting current in a direction to effect discharge of said precharged capacitor whereby said capacitor is subsequently charged inversely, the transformer flux bias being changed by said discharge, and means operable when said first valve becomes non-conductive following said inverse charging for rendering said second valve conductive, said second valve being capable of conducting current in a direction to effect discharge of the inversely charged capacitor whereby the transformer flux is reset.

10. For use in supplying current to a load through a magnetic core transformer having primary and secondary windings with said secondary being connected in circuit with said load, the combination comprising a capacitor, means for precharging said capacitor with one polarity, means for effecting a first discharge of the precharged capacitor in one direction through a first predetermined number of turns of said primary winding whereby said capacitor is subsequently charged with an opposite polarity, and means for thereafter effecting a second discharge of the capacitor charge of opposite polarity in the opposite direction through a second predetermined number of turns of said primary winding whereby said capacitor is again charged with said one polarity, the ratio of said first number of turns to said second number of turns being approximately equal to the ratio of the change of charge on said capacitor during said first discharge to the change of charge on said capacitor during the second discharge.

11. For use in supplying current to a load through a magnetic core transformer having primary and secondary windings with said secondary being connected in circuit with said load, the combination comprising a capacitor, means for precharging said capacitor to a first voltage of one polarity, means including a first electric discharge valve of the arc-like type connecting said capacitor in circuit with a first predetermined number of turns of said primary winding, means including a second electric discharge valve of the arc-like type connecting said capacitor in circut with a second predetermined number of turns of said primary winding, means for rendering said first valve conductive, said first valve being capable of conducting current in a direction to effect a first discharge of said precharged capacitor whereby said capacitor is subsequently charged inversely to a second voltage smaller in magnitude than said first voltage, and means operable when said first valve becomes non-conductive following said inverse charging for rendering said second valve conductive, said second valve being capable of conducting current in a direction to effect a second discharge of the inversely charged capacitor whereby said capacitor is charged to a third voltage of said one polarity smaller in magnitude than said second voltage, the ratio of said first number of turns to said second number of turns being approximately equal to the ratio of the change of charge on said capacitor during said first discharge to the change of charge on said capacitor during said second discharge.

12. For use in supplying current to a load through a magnetic core transformer having primary and secondary windings with said secondary being connected in circuit with said load, the combination comprising a capacitor, means for precharging said capacitor to a first voltage of one polarity, means for effecting discharge of the precharged capacitor in one direction through a discharge circuit including a first predetermined number of turns of said primary winding, whereby said capacitor is subsequently charged inversely to a second voltage, the characteristics of said discharge circuit being such that the magnitude of said second voltage is of the order of one-half the magnitude of said first voltage, and means for thereafter effecting discharge of the inversely charged capacitor in the opposite direction through a second predetermined number of turns of said primary winding approximately three times greater than said first number.

13. For use in supplying current to a load through a magnetic core transformer having primary and secondary windings with said secondary being connected in circuit with said load, the combination comprising a capacitor, means for precharging said capacitor with one polarity, mean for supplying a direct current through at least a portion of said primary winding to provide a flux bias for said transformer, means for effecting a first discharge of the precharged capacitor in one direction through a first predetermined number of turns of said primary winding whereby said capacitor is subsequently charged with an opposite polarity, the transformer flux being changed by said discharge, and means for thereafter effecting a second discharge of the capacitor charge of opposite polarity in the opposite direction through a second predetermined number of turns of said primary winding whereby said capacitor is again charged with said one polarity, the ratio of said first number of turns to said second number of turns being approximately equal to the ratio of the change of charge on said capacitor during said first discharge to the change of charge on said capacitor during the second discharge so that the transformer flux is reset.

14. For use in supplying welding current through material to be welded which is in circuit with welding electrodes and the secondary winding of a magnetic core transformer having primary and secondary windings, the combination comprising, a capacitor, means for precharging said capacitor to a first preselected voltage, means for effecting discharge of said capacitor in one direction through a first predetermined number of turns of said primary winding, whereby said capacitor is charged inversely to a second voltage less in magnitude than said first voltage, and means for thereafter effecting discharge of the inversely charged capacitor in the opposite direction through a second predetermined number of turns of said primary winding greater than said first number, said first voltage being of sufficient magnitude to effect welding of the material upon discharge of said precharged capacitor and said second voltage being of a magnitude insufficient to effect welding of the material upon discharge of said inversely charged capacitor.

15. For use in supplying welding current through material to be welded which is in circuit with welding electrodes and the secondary winding of a magnetic core transformer having primary and secondary windings, the combination comprising, a capacitor, means for precharging said capacitor to a first preselected voltage, means including first electric valve means for effecting discharge of said capacitor in one direction through a first predetermined number of turns of said primary winding, whereby said capacitor is charged inversely to a second voltage less than said first voltage, and means including second electric valve means operable in response to a cessation of current through said first number of turns following said discharge for effecting discharge of the inversely charged capacitor in the opposite direction through a second predetermined number of turns of said primary winding greater than said first number, said first voltage being of sufficient magnitude to effect welding of the material upon discharge of said precharged capacitor and said second voltage being of a magnitude insufficient to effect welding of the material upon discharge of said inversely charged capacitor.

16. For use in supplying welding current through material to be welded which is in circuit with welding electrodes and the secondary winding of a magnetic core transformer having primary and secondary windings, the combination comprising, a capacitor, means for precharging said capicitor to a first voltage of one polarity, circuit means including a first electric discharge valve of the arc-like type connecting said capacitor in circuit with a first predetermined number of turns of said primary winding, means for rendering said first valve conductive to effect discharge of said precharged capacitor in one direction through said first number of turns, whereby said capacitor is subsequently charged inversely to a second voltage of a smaller magnitude than said first voltage, means including a second electric discharge valve of the arc-like type connecting said capacitor across a second predetermined number of turns of said primary winding greater than said first number, and means for rendering said second valve conductive immediately after said first valve becomes non-conductive to effect discharge of said inversely charged capacitor in the opposite direction through said second number of turns, said first voltage being of sufficient magnitude to effect welding of said material upon discharge of said precharged capacitor and said second voltage being of a magnitude insufficient to effect welding upon discharge of the inversely charged capacitor.

17. For use in supplying welding current through material to be welded which is in circuit with welding electrodes and the secondary winding of a magnetic core transformer having primary and secondary windings, the combination comprising, a capacitor, means for precharging said capacitor to a first preselected voltage, means for supplying a direct current through at least a portion of said primary winding as a flux bias for said transformer, means for effecting discharge of said capacitor in one direction through a first predetermined number of turns of said primary winding, whereby said capacitor is charged inversely to a second voltage less than said first voltage, the transformer flux being changed by said discharge, and means for thereafter effecting discharge of the inversely charged capacitor in the opposite direction through a second predetermined number of turns of said primary winding greater than said first number to reset the transformer flux, said first voltage being of sufficient magnitude to effect welding of the material upon a discharge of said capacitor and said second voltage being of a magnitude insufficient to effect welding of the material.

18. For use in supplying welding current through material to be welded which is in circuit with welding electrodes and the secondary winding of a magnetic core transformer having primary and secondary windings, the combination comprising, a capacitor, means for precharging said capacitor to a first preselected voltage of one polarity, means for effecting a first discharge of said capacitor in one direction through a first predetermined number of turns of said primary winding, whereby said capacitor is charged inversely to a second voltage less in magnitude than said first voltage, and means for thereafter effecting a second discharge of the inversely charged capacitor in the opposite direction through a second predetermined number of turns of said primary winding, the ratio of said first number of turns to said second number of turns being approximately equal to the ratio of the change of charge on said capacitor during said first discharge to the change of charge on the capacitor during said second discharge, said first voltage being of sufficient magnitude to effect welding of the material upon discharge of said precharged capacitor and said second voltage being of a magnitude insufficient to effect welding of the material upon discharge of said inversely charged capacitor.

19. For use in supplying current to a load through a magnetic core transformer having primary and secondary windings with said secondary being connected in circuit with said load, the combination comprising a capacitor, means for precharging said capacitor, a resistor, means for effecting discharge of the precharged capacitor in one direction through said resistor and a first predetermined number of turns of said primary winding whereby said capacitor is subsequently charged inversely, an auxiliary peaking transformer having input and output circuits with its input circuit connected across said resistor, said auxiliary transformer being saturable by an input voltage which is small compared with the maximum voltage developed across said resistor by said discharge, whereby the auxiliary transformer develops a voltage impulse in its output circuit as the current through said primary winding drops to zero following said discharge, which voltage impulse exists beyond the time of zero current, and means responsive to said voltage impulse in said output circuit for effecting discharge of the inversely charged capacitor in the opposite direction through a second predetermined number of turns of said primary winding greater than said first number.

STEPHEN L. BURGWIN.
JOHN R. MAHONEY.
HARRY J. BICHSEL.